C. WINKLER & K. H. THOENE.
COTTON CHOPPER.
APPLICATION FILED OCT. 20, 1908.
915,009.
Patented Mar. 9, 1909.
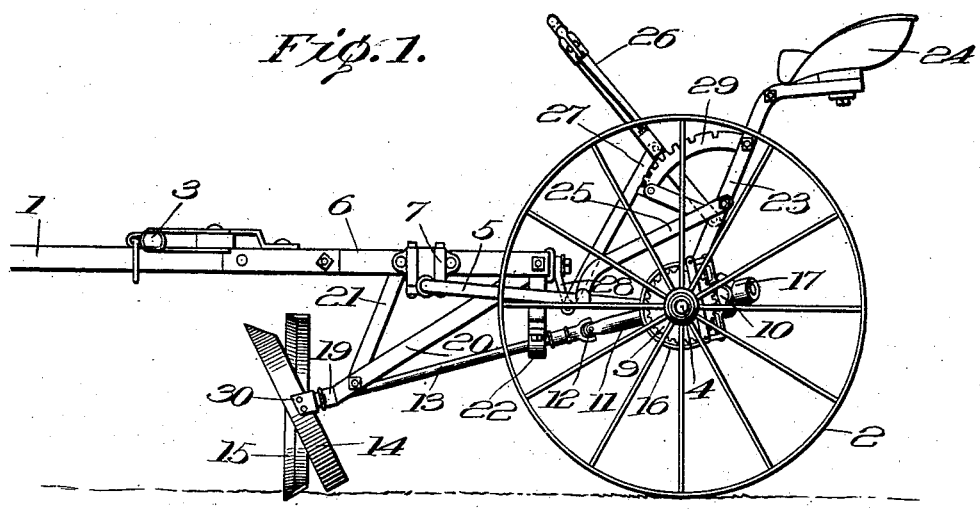
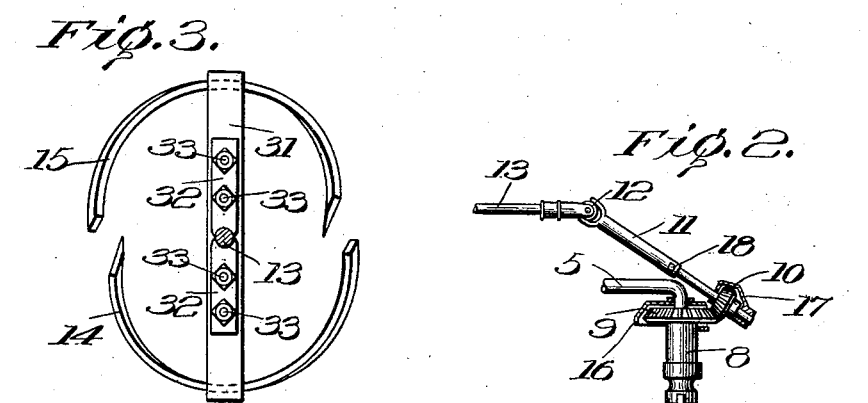
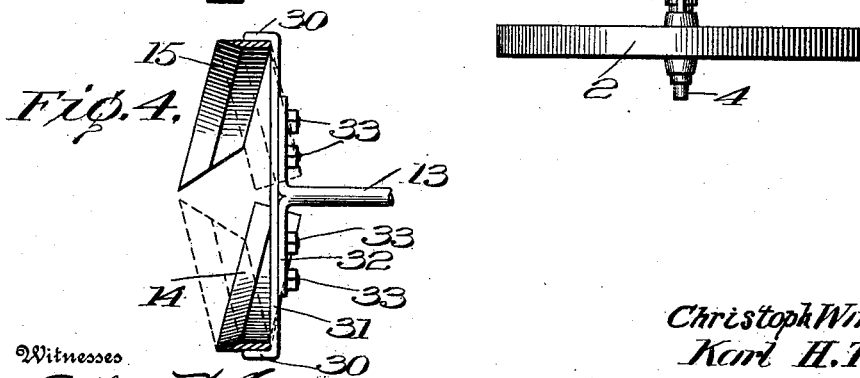
Inventors
Christoph Winkler
Karl H. Thoene
By Victor J. Evans
Attorney

UNITED STATES PATENT OFFICE.

CHRISTOPH WINKLER AND KARL H. THOENE, OF LOCKHART, TEXAS.

COTTON-CHOPPER.

No. 915,009.  Specification of Letters Patent.  Patented March 9, 1909.

Application filed October 20, 1908. Serial No. 458,626.

*To all whom it may concern:*

Be it known that we, CHRISTOPH WINKLER and KARL H. THOENE, citizens of the United States, residing at Lockhart, in the county of Caldwell and State of Texas, have invented new and useful Improvements in Cotton-Choppers, of which the following is a specification.

This invention relates to cotton choppers, the object in view being to provide a simple, practical and economical cotton chopper involving a novel construction, arrangement and operation of chopping blades, whereby a great saving in the cotton crop may be effected, the cotton worked or chopped out with greater rapidity and the refuse cotton and weeds turned to one side, thereby leaving the rows of cotton clean.

With the above and other objects in view, the nature of which will more fully appear as the description proceeds, the invention consists in the novel construction, combination and arrangement of parts as herein fully described, illustrated and claimed.

In the accompanying drawings, Figure 1 is a side elevation of a cotton chopper embodying the present invention, Fig. 2 is a detail plan view thereof partly in section showing the driving gear, Fig. 3 is a detail vertical cross section showing the shape of the chopping blades, Fig. 4 is a vertical section taken at right angles to Fig. 3.

Referring to the drawings, 1 designates the tongue or draft pole of the implement, 2 the carrying wheels thereof, and 3 the whiffletree for the attachment of animals.

In carrying out the present invention, one of the carrying wheels 2 constitutes the driving wheel by means of which motion is imparted to the chopping blades hereinafter described. The axle upon which the carrying wheels are mounted is substantially U-shaped with outwardly projecting ends forming the spindles 4 upon which the carrying wheels are journaled, the body of said axle shown at 5 passing under the machine frame shown at 6 and being secured thereto by clips 7 as shown in Fig. 1. The frame 6 is substantially rectangular in plan, comprising oppositely arranged side bars to which the clips 7 are connected.

The carrying wheel 2 which constitutes the driving wheel, embodies a hollow axle 8 which is journaled upon the adjacent spindle of the main axle and which has fast thereon a driving gear wheel 9. This wheel 9 meshes with and drives a pinion 10 which is fast on the rear end section 11 of a tumbling shaft, said section 11 having a universal joint at 12 with the forward section 13 of the tumbling shaft section 13 forming the chopper shaft to which the chopping blades 14 and 15 are secured and by which rotary motion is imparted to said blades.

The gears 9 and 10 are preferably inclosed in and protected by gear cases or hoods 16 and 17 as illustrated in Figs. 1 and 2 and it is preferable to make the shaft section 11 longitudinally extensible as shown in Fig. 3 by providing said shaft with relatively slidable telescopic sections adapted to be held in fixed relation to each other when adjusted by means of a set screw 18.

The chopping blade shaft section 13 inclines downwardly toward its forward end and is mounted adjacent to its forward end in a bearing 19 carried by the forward end of a hanger 20 secured at its rear upper end to the frame 6.

21 designates a brace which is interposed between the main frame 6 and the forward end portion of the hanger 20 as clearly shown in Fig. 1. The rear end portion of the shaft section 13 is journaled in another hanger 22 extending downwardly from the lower side of the main frame as seen in Fig. 1.

The main body portion 5 of the main axle of the machine is adapted to turn in the clips 7 in order to provide for an adjustment of the tongue and machine frame up and down this being accomplished by means which will now be described.

23 designates the seat standard upon which is mounted the driver's seat 24. Between the standard 23 and the said portions of the axle there are interposed braces 25. Connected to one of the standards 23 is a thumb latch lever 26 from which a link 27 extends downward to and connects with a bracket 28 secured to the rear end portion of the main frame 6. The latch of said lever coöperates with a rack segment 29 secured to the seat standard 23. The operator by moving the thumb latch lever may raise or lower the main frame of the machine and lift and depress the chopping blades.

Each of the chopping blades is of arcuate form and substantially semi-circular. There are two chopping blades which are connected about centrally to the forwardly inclined feet 30 of a fork 31, the latter being secured to the forward end of the shaft section 13 which is bifurcated and spread as shown at 32 to bear against the fork 31, the parts 31 and 32 being bolted or otherwise secured firmly together as indicated at 33. The blades 14 and 15 are sharpened at their forward edges, said forward edges constituting the cutting edges of the blades. The blades are also set spirally as clearly indicated in Figs. 1 and 4, the arrangement causing said blades to cut with a shearing action as they are rotated by the driving shaft upon which they are mounted. The shaft of the blades also adapts them to cut very close to the surface of the ground and in fact slightly beneath the surface of the ground so as to efficiently sever the roots of the plants. It is also preferred to bevel or sharpen the forward extremities of the blades bringing the same to a point to enable them to more easily penetrate the soil and chop out the cotton plants and weeds and throw the same centrifugally to one side of the road.

The chopper blades hereinbefore described form what resembles and operates as a large auger with two cutting blades and by revolving said blades at the proper speed they chop out the cotton so as to leave the same in hills at the proper distance apart. At the same time said blades chop out the weeds also and by centrifugal action throw the weeds and refuse cotton to the sides of the rows, thereby leaving the rows clean.

We claim:—

A cotton chopper embodying a rotary tumbling shaft having a fork at the forward end thereof, spirally arranged chopping blade segments centrally secured to the extremities of said fork and actuated thereby, a hanger fastened to the machine frame and provided with a bearing for the forward section of said shaft, a brace interposed between said bearing and the machine frame, and beveled gearing connecting the rear section of said tumbling shaft with one of the carrying wheels of the machine, said rear section of the shaft being disposed obliquely with relation to the path of movement of the machine.

In testimony whereof we affix our signatures in presence of two witnesses.

CHRISTOPH WINKLER.
KARL H. THOENE.

Witnesses:
STANLEY SMITH,
GEO. W. BAKER.